United States Patent [19]

Assal et al.

[11] Patent Number: 4,931,802
[45] Date of Patent: Jun. 5, 1990

[54] MULTIPLE SPOT-BEAM SYSTEMS FOR SATELLITE COMMUNICATIONS

[75] Inventors: Francois T. Assal, Bethesda; John V. Evans, Gaithersburg, both of Md.; Christoph E. Mahle, Washington, D.C.; Amir I. Zaghloul, Bethesda; Ramesh K. Gupta, Rockville, both of Md.

[73] Assignee: Communications Satellite Corporation

[21] Appl. No.: 167,287

[22] Filed: Mar. 11, 1988

[51] Int. Cl.⁵ .............................................. H04B 7/19
[52] U.S. Cl. ................................. 342/356; 342/373; 370/97; 370/57; 455/12
[58] Field of Search .................. 342/373, 356; 370/57, 370/75, 80, 97; 455/12; 333/104

[56] References Cited

U.S. PATENT DOCUMENTS

| | | | |
|---|---|---|---|
| 4,254,385 | 3/1981 | Childs et al. | 333/104 |
| 4,259,741 | 3/1981 | Kawai | 370/75 |
| 4,355,388 | 10/1982 | Deal | 370/80 |
| 4,375,697 | 1/1983 | Vishner | 342/356 |
| 4,425,639 | 1/1984 | Acampora et al. | 370/97 |
| 4,813,036 | 3/1989 | Whitehead | 370/57 |

Primary Examiner—Nelson Moskowitz
Assistant Examiner—David Cain
Attorney, Agent, or Firm—Sughrue, Mion, Zinn, Macpeak & Seas

[57] ABSTRACT

On-board satellite switching is performed in three stages, an outer stage of switching on the up-link side for routing the received signals to either demodulators or frequency translators, a first inner stage of switching, preferably a baseband switch and processor, for routing and processing the outputs of the demodulators, a second inner stage of switching, e.g., a microwave switch matrix, for routing the outputs of the frequency translators, and an outer stage on the down-link side for assembling and routing the down-link spot beams. For a multiple hopping-beam system, the outer stages are microwave switch matrices, and for a hybrid scanning-hopping system the outer stages are beam forming matrices. A general purpose modified rearrangeable switch matrix is also disclosed.

40 Claims, 14 Drawing Sheets

MULTIPLE SPOT-BEAM SYSTEMS FOR SATELLITE COMMUNICATIONS

BACKGROUND OF THE INVENTION

The present invention relates to satellite communications systems and more particularly to a system using distributed routing and switching systems which minimize the quantity of satellite hardware while achieving the desired objectives of high capacity highly flexible access and high reliability for long life.

Still more particularly, the present invention is directed to multiple pencil-beam, high capacity satellite systems which provide highly flexible access using a satellite-switched, time-division multiple-access (SS-TDMA) mode of operation with on-board regeneration and processing.

In satellite communications systems, service costs can be reduced by providing distributed access via low cost earth stations. This is likely to require a proliferation of inexpensive and unattended earth stations that have relatively small antennas and are preferably located at the customer's premises. To compensate for the lower earth station antenna gain, satellite-radiated energy density needs to be increased significantly by concentrating the useful signal energy into a large number of pencil beams having high G/T and high e.i.r.p., rather than spread-out coverage areas such as a hemisphere or the entire globe. The beams may use orthogonal polarization isolation and spatial isolation if necessary. As a result, the overall satellite capacity can be multiplied by reusing the allocated frequency bands at C- and $K_u$- bands, provided the beam-to-beam co-channel interference can be minimized. This can be achieved by on-board regeneration of all the digital signals, since demodulation and remodulation effectively separate performance degradations of the up- and down-links and only result in the algebraic additions of bit-error rates.

These improvements, however require more sophisticated SS-TDMA earth station equipment and a highly flexible means on board the satellite for interconnecting all the earth stations located in different coverage areas or beams. See for example, F. T. Assal, R. Gupta, J. Apple, and A. Lopatin "A Satellite Switching Center for SS-TDMA Communications," *COMSAT Technical Review*, Vol. 12, No. 1, Spring 1982, pp. 29-68; S. J. Campanella and R. Colby, "Network Control for TDMA and SS-TDMA in Multiple-Beam Satellite Systems,"Fifth International Conference on Digital Satellite Communications, Genoa, Italy, March 1981: and T. Inukai, "An Efficient SS-TDMA Time Slot Assignment Algorithm," *IEEE Transactions on Communications*, Vol. COM-27 No. 10 October 1979 pp. 1449-1455. Compared to global coverage satellites, multiple-narrow-beam satellites complicate the overall system architecture by requiring flexible interconnections possibly among all the participating earth stations. Microwave switch matrices (MSMs) have been proposed for satellite-switched time-division multiple-access (SS-TDMA) in INTELSAT VI, as described by S. B. Bennett and D. J. Braverman "INTELSAT VI -A Continuing Evolution," *Proc. IEEE*, Vol. 72, November 1984, pp. 1457-1468, and it is anticipated that regeneration, baseband switching and/or processing will be introduced on-board NASA's Advanced Communications Technology Satellite (ACTS), as described by W. Holmes and G. Beck, "The ACTS Flight Segment: Cost Effective Advanced Communications Technology," AIAA 10th Communications Satellite Systems Conference, Orlando, Fla., March 1984. and in Italy's ITALSAT, as described by S. Tirro, "The ITALSAT Pre-Operational Program," Sixth International Conference on Digital Satellite Communications, Phoenix, Ariz. September 1983. Thus, the simultaneous operation of a large number of pencil beams becomes a feasible and attractive means of reducing communications service cost. With regeneration, the number of simultaneously operating beams can be increased significantly, since beam-to-beam co-channel interference is limited to up and down-links separately.

Another important aspect of communications system design is hardware redundancy. To ensure communications hardware survivability in space, redundancy (2-for-1, or 3-for-2) is usually provided for all active subsystems, that is, for the low-noise receivers (LNRs) and the high-power amplifying transmitters. Depending on the requirements, enhanced satellite reliability is achieved by pooling failure-prone devices such as the frequency channelized power transmitters, to produce a "double-ring" redundancy network, as shown in FIGS. 1 and 2. See, for example, F. T. Assal, C. Mahle and A. Berman, "Network Topologies to Enhance the Reliability of Communications Satellites," *COMSAT Technical Review*, Vol. 6 No. 2, Fall 1976, pp. 309-322. In this hypothetical example, a 12-for-8 double-ring redundancy is provided for enhanced reliability. Any 4 of the 12 transmitters could fail without affecting the operation of eight channels, because the RF signals would be routed to the surviving amplifiers.

The present invention is directed to improvements in multibeam systems. However, to place the present invention in proper perspective, a brief review of the advantages of global beam satellites will first be provided, followed by a discussion of multiple-beam configurations that use fixed, scanning, and hopping beam techniques which allocate critical satellite resources by inner switching, outer routing, or outer switching, respectively.

Global beam coverage satellites with no routing/switching, receiving communications signals at 6 GHz and retransmitting at 4 GHz, provide for the simplest and most flexible operational systems. Such systems were used in early INTELSAT satellites and are currently provided as complementary packages in multiple-beam systems such as INTELSAT V and VI. A single beam covering the 18° field of view of the earth is generated using a single horn with an edge-of-coverage gain of about 17 dBi. As a result, low G/T and low e.i.r.p. require large earth station antennas. Also, the allocated frequency band (500 MHz in the up-link and 500 MHz in the down-link) may be reused only once, thereby limiting the overall available capacity. Since the earth stations could receive all the satellite transmitted signals this single-beam coverage provides full connectivity in either frequency-division multiple access (FDMA) or TDMA.

Multiple spot beams can be implemented as fixed, hopping, and/or scanning beams. Fixed SS-TDMA beams are configured (as is being done for a relatively small number of beams in INTELSAT VI and ITALSAT) once it is assumed that the traffic capacity projections are fairly accurate and that each beam contains sufficient capacity to warrant the dedication of scarce power resources to the illuminated areas.

In a fixed multibeam system with inner routing/switching, all of the beams are basically frozen, critical satellite resources are permanently assigned to each beam, and signal inner-routings or switching cannot reallocate these resources.

Conceptually, flexibility of operation in an on board processing SS-TDMA satellite system can be provided by using multiple scanning beams. In the case of scanning systems, the narrow beams formed by using an active phase-array antenna are steered on demand to focus the radiated power on specific areas. FIG. 5 depicts a large number of spot beams (e.g., about 100 for 1.0° beams or about 400 for 0.5° beams) covering land masses within the AOR global coverage area visible from geostationary orbit. To significantly increase the communications capacity and flexibility of access within the SS TDMA frame, adjacent beams may be scheduled to have different frequencies of operation, and multiple frequency reuse can be implemented for spatially isolated beams. As the beams are narrowed, the resulting increase in satellite antenna gain, with a concomitant increase in G/T and e.i.r.p., makes possible distributed access via low-cost customer-premises earth stations.

An alternative technique of obtaining flexibility is a multiple hopping beam system. The hopping-beam configuration contains a full complement of antenna elements, low noise amplifiers (LNAs), and power transmitters, which are energized on demand only when required for transmissions. Single feed elements in conjunction with a focal-region-fed optical system, are used to generate a number of pencil beams for the multiple-hopping concept. A spherical wave radiating from the single feed element (or from a cluster of very few feeds) is transferred through a single- or dual-reflector system to produce a plane wave in the desired direction of the beam. The single offset reflector configuration is the simplest and currently the most widely used for communications satellites while a dual-reflector system produces less scan loss and better co- and cross polarization isolation. Recently, it has been shown that a side-fed offset Cassegrain system offers the best overall performance among the dual-reflector configurations. See for example, R. Jorgensen, P. Balling and W. J. English, "Dual Offset Reflector Multibeam Antenna For International Communications Satellite Applications," *IEEE Transactions on Antennas and Propagation,* Vol. AP-33, December 1985, pp. 1304–1312.

Turning attention specifically to the Intelsat system, the primary motivation in designing the INTELSAT I through VI series of satellites was to satisfy an increasing demand for communications capacity to and from large gateway or national earth stations (i.e., a capacity increase of from 240 to 33,000 telephone channels per satellite). To meet this capacity demand, INTELSAT VI was designed to reuse the allocated frequency bands by focusing its radiated energy into two and six isolated beams at $K_u$- and C-bands respectively. At $K_u$-band, two spatially isolated spot beams are provided having approximately 40 dBi of gain, while at C band there are four spatially isolated zones in one polarization sense with approximately 30 dBi of gain and two spatially isolated hemispherical beams with the opposite sense of polarization with approximately 23 dBi of gain.

To include areas not covered by any of these beams, two orthogonal earth coverage (global) beams having approximately 17 dBi of gain utilize about 120 MHz of allocated bandwidth at C-band. FIG. 3 illustrates the coverage areas of these beams for the Atlantic Ocean Region (AOR) At C-band, the zone and hemi beams have opposite circular polarization, while at $K_u$-band the spot beams have orthogonal linear polarization. To accommodate the different locations of population centers in the Indian and Pacific Ocean Regions, two complex sets of mechanical switches are provided in the satellite antenna subsystems at C-band. Since the primary mode of transmission is FDMA, path to-path interconnections are easily achieved with a set of semi-static mechanical switches for frequency multiplexed channels having bandwidths of 36 or 72 MHz. To increase the flexibility of operation and access, two ($6 \times 6$) MSMs are introduced for SS-TDMA in two 72-MHz channels. In either case inner-switching, and hence a fixed-beam satellite concept, is employed.

Although the beams are designed to be isolated, sidelobes and imperfect polarization result in a system that is limited by co-channel interference. As communications capacity requirements continue to increase beyond INTELSAT VI for the primary satellite (i.e., the satellite which will permit all earth stations located within the global coverage area, as seen from geosynchronous orbit, to communicate with each other) it may be necessary to demodulate and remodulate digital signals, thereby increasing the number of frequency reuses by providing a larger number of narrow, pencil-like beams The use of on board regeneration with hard-decision isolates up- and down-link impairments and allows each transmission path to be optimized separately. In the up-link these impairments include the temperature of the earth, thermal noise (primarily generated in the receiver) and adjacent beam-to-beam co-channel interference Similar effects occur in the down-link.

On-board data regeneration is described by S. J. Campanella, F. T. Assal and A. Berman, "On-Board Communication Processing Technology," Symposium on Transportation and Communications, Genoa, Italy, October 1980; S. J. Campanella, F. T. Assal and A. Berman, "On-Board Regenerative Repeater " IEEE International Conference on Communications, Chicago Ill., June 1977, *Conference Record,* pp. 6.2-121 to 6.2-125; and Y. S. Lee, "Simulation Analysis For Differentially Coherent Quaternary PSK Regenerative Repeater," *COMSAT Technical Review* Vol 7. No. 2 Fall 1977, pp. 447–474. On-board data regeneration results in the addition of up- and down-link bit error rates (BERs), whereas a nonregenerative satellite causes up-link impairments to be passed to the down-link Therefore on-board regeneration allows for a significant reduction in the up and down-link energy-per-bit to noise-power-density ratios ($E_b/N_o$) in order to achieve the same BERs Alternatively, the desired performance can be achieved even with several co-channel interferers by using several "isolated" beams operating simultaneously in the same frequency bands.

An on-board processing multi-beam satellite configuration will be described with reference to FIG. 4, which shows a simplified block diagram of a fixed-multibeam, on-board processing satellite for SS-TDMA operation. This representative example comprises N up- and down-link beams. Using conventional techniques, the allocated frequency band for each of the N fixed beams is subdivided or demultiplexed into M channels. Up to ($M \times N$) up-link TDMA signals are received, low-noise amplified, demultiplexed into separate (1-to-M) channels and then demodulated. Assuming quaternary phase-shift keying (QPSK) the output of each demodulator includes the recovered clock component and the regenerated I and a bit streams.

Inner routing/switching and on-board processing precede remodulation power amplification, multiplexing, and retransmission of the regenerated carriers through a set of N fixed beams. Assuming that some beams are only lightly loaded it is wasteful of satellite resources to provide these beams with M channels. Hence, once a channel is assigned, bit rate selection for transmission to and from these low-capacity beams severely restricts the participating earth stations. In addition, flexibility in selecting carrier sizes, as provided in nonregenerative FDMA systems is no longer possible Therefore, the limitations of inner-routing or switching are inconsistent with the marketplace, which is driving satellite system architectures toward greater efficiency and cost consciousness while demanding highly flexible access to a growing number of services and customers.

As the number of beams is increased in order to increase G/T, e.i.r.p. and the number of frequency reuses, most of the areas covered by the narrow beams do not need to be illuminated all the time. Therefore hopping and scanning beams provide additional flexibility by assigning the available RF power in short cyclical intervals on demand.

SUMMARY OF THE INVENTION

It is an object of this invention to provide multibeam systems with improved operational flexibility.

It is a further object of this invention to provide an improved switching configuration for use among other things in the improved multibeam communications systems of the present invention.

It is a still further object of this invention to provide an improved on-board switching system which will minimize the quantity of satellite hardware while achieving the desired objectives of high capacity, highly flexible access, and high reliability for long life.

Briefly, the above and other objects of the invention are achieved through the use of both inner and outer routing/switching. In a preferred embodiment, a first array or matrix selectively directs the received channels to either demodulators or frequency translators. An inner array or matrix includes both a baseband switch and processor section for processing and switching the outputs of the demodulators and a matrix for switching the outputs of the frequency translators. The outputs of the baseband switch and processor section are then remodulated and provided to a third matrix array, while the outputs of the inner switch matrix are also provided to the third matrix, with frequency translation if necessary. In a distributed hopping beam system, the outer matrices are microwave switch matrices and in a hybrid scanning-hopping multibeam system the outer matrices are beam forming matrices.

In addition, a new type of rearrangeable switch matrix is disclosed which will have wide application, in addition to its use in a SS-TDMA system and includes a plurality of crossbar switch matrices combined to form a minimum element rearrangeable matrix.

BRIEF DESCRIPTION OF THE DRAWINGS

The invention will be more clearly understood from the following description in conjunction with the accompanying drawings, in which.

DETAILED DESCRIPTION OF THE INVENTION

Figure 6:
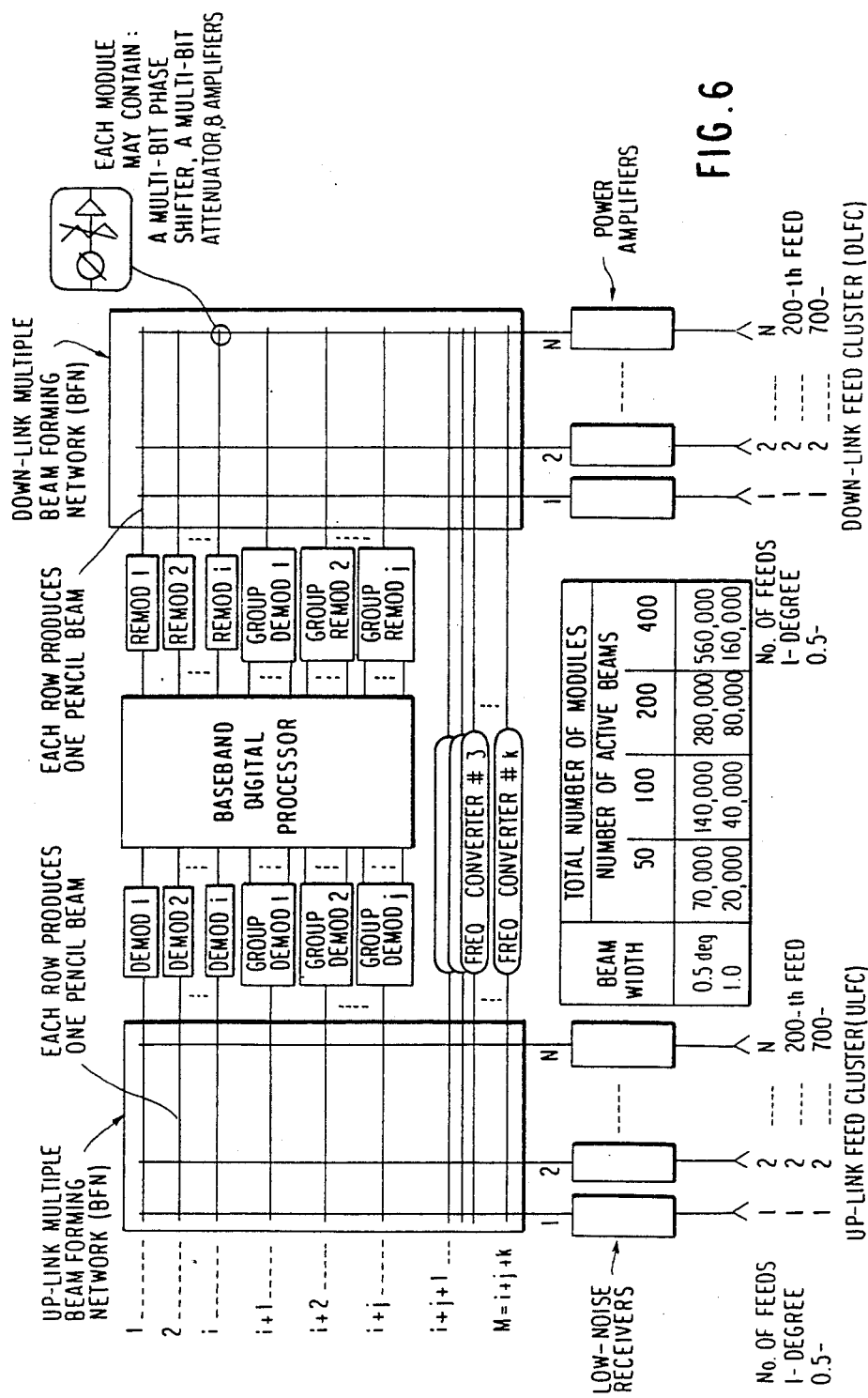
FIG. 6 is a conceptual block diagram of a new multiple scanning-beam satellite system, with outer routing.

FIG. 6 is a conceptual block diagram of a multiple scanning beam system with outer routing. As shown on the right-hand side of the figure, the power transmit subsystem consists of a beam-forming matrix (BFM), solid-state power amplifiers (SSPAs), and a cluster of feeds for the down-links (DLFC). The BFM contains N-way equal-power divider and M-way equal-power combiner circuits (illustrated schematically as horizontal and vertical lines, respectively) and a matrix of active modules which connect these lines at their intersections. Each active module contains a multibit phase shifter and amplifiers, and may or may not include a digital attenuator for gain control. The transmit BFM contains (N×M) active modules where N=200 for the 1.0° and 700 for the 0.5° beams. A table within FIG. 6 displays the total number of modules per satellite for various numbers of active beams. Each horizontal row defines a beam whose shape and direction of transmission are controlled by combined settings of all the active modules in that row. Since each beam is independently controlled several beams can be co-located and used together with frequency discrimination in regions of high communications capacity. Therefore, this subsystem can transmit up to $M=(i+j+k)$ independently and simultaneously scanning beams. The number of active beams M, is independent of the number of radiating elements N, in the array.

In this multibeam system each SSPA simultaneously amplifies signal components contributed by all the active beams. As a result the SSPA input drive levels must be set to ensure nearly linear operation with an acceptable level of intermodulation. Also every beam is generated by exciting all elements in the array and by using all of the SSPAs feeding those elements. This offers a graceful degradation in case of amplifier failures.

By sending a signal through one row, a pencil beam is produced "optically" by the addition in free space of all the phase-controlled outputs emanating from the feed cluster. The superposition of these outputs produces a plane wave, and the beam direction is selected by controlling the relative phase of all the active modules in the row. Multiple pencil beams are obtained by transmitting signals through any number of rows in the BFM. The feed cluster can be used either as a direct radiating array or as an active source for a dual-reflector system such as a near-field Gregorian, as described by R. M. Sorbello A. I. Zaghloul, B. S. Lee, S. Siddiqi and B. D. Geller "20-GHz Phased-Array-Fed Antennas Utilizing Distributed MMIC Modules," *COMSAT Technical Review*, Vol. 16, No. 2, Fall 1986 pp. 339-373. Operationally most of the beam positions may change in a prescribed way, several times during the 2 ms SS-TDMA frame duration as described in the above cited paper by T. Inukai.

The system depicted in FIG. 6 operates as follows. Up-link signals transmitted from spatially isolated beams are received by the up-link feed cluster (ULFC), and are low-noise amplified. At the receive BFM, the signals are distributed to the active modules. By programming the phase settings in each row of active modules, the signal components are separated to selectively appear at the inputs of the high-bit-rate demodulator, a flexible group or bulk demultiplexer/demodulator, or a frequency down-converter. See, for example R. G. Egri K. Karimullah and F. T. Assal, "A 120-Mbit/s TDMA QPSK Modem for On-Board Applications," *COMSAT Technical Review*, Vol. 17, No. 1, Spring 1987, pp. 23-54 and S. J. Campanella, S. Sayegh and R. Fang, "A Flexible On-Board Demultiplexer/Demodulator," AIAA 12th International Communication Satellite Systems Conference, Arlington, Va. March 1988. To accommodate high-capacity communications beams which transmit several frequency multiplexed carriers simultaneously, two or more rows receive the same signals for frequency discrimination or filtering in the processing circuits. After on-board remodulation, the signals are routed to the proper down-links.

Several techniques may be used to optimize the specific configurations, design, and frequency assignments of the on-board processing hardware located between the two BFMs. The desired reliability is achieved by adding a number of redundant rows in the BFMs to be connected to redundant high-bit-rate demodulators and/or frequency down-converters, In the event of failure in either the BFMs or the processing circuits, alternate transmission paths are selected to bypass the failed components. Additional redundancy may not be necessary for SSpAs or LNAs, since active phased arrays display graceful degradation.

In summary, outer-routing in the multibeam phased-array system provides the desired operational flexibility, since fractional assignment of the available RF power, as well as access to the various demodulators or frequency translators is accomplished selectively on demand. This system easily adjusts to different orbital locations and ocean regions. Finally, up to 2 GHz of dynamic bandwidth can be provided to noncontiguous high-capacity beams by using dual polarized arrays at C and $K_u$-bands. Unfortunately, this flexible system contains a large number of active components which must operate several decibels below saturation since all signals are amplified by all the SSPAs in the system.

Figure 7:
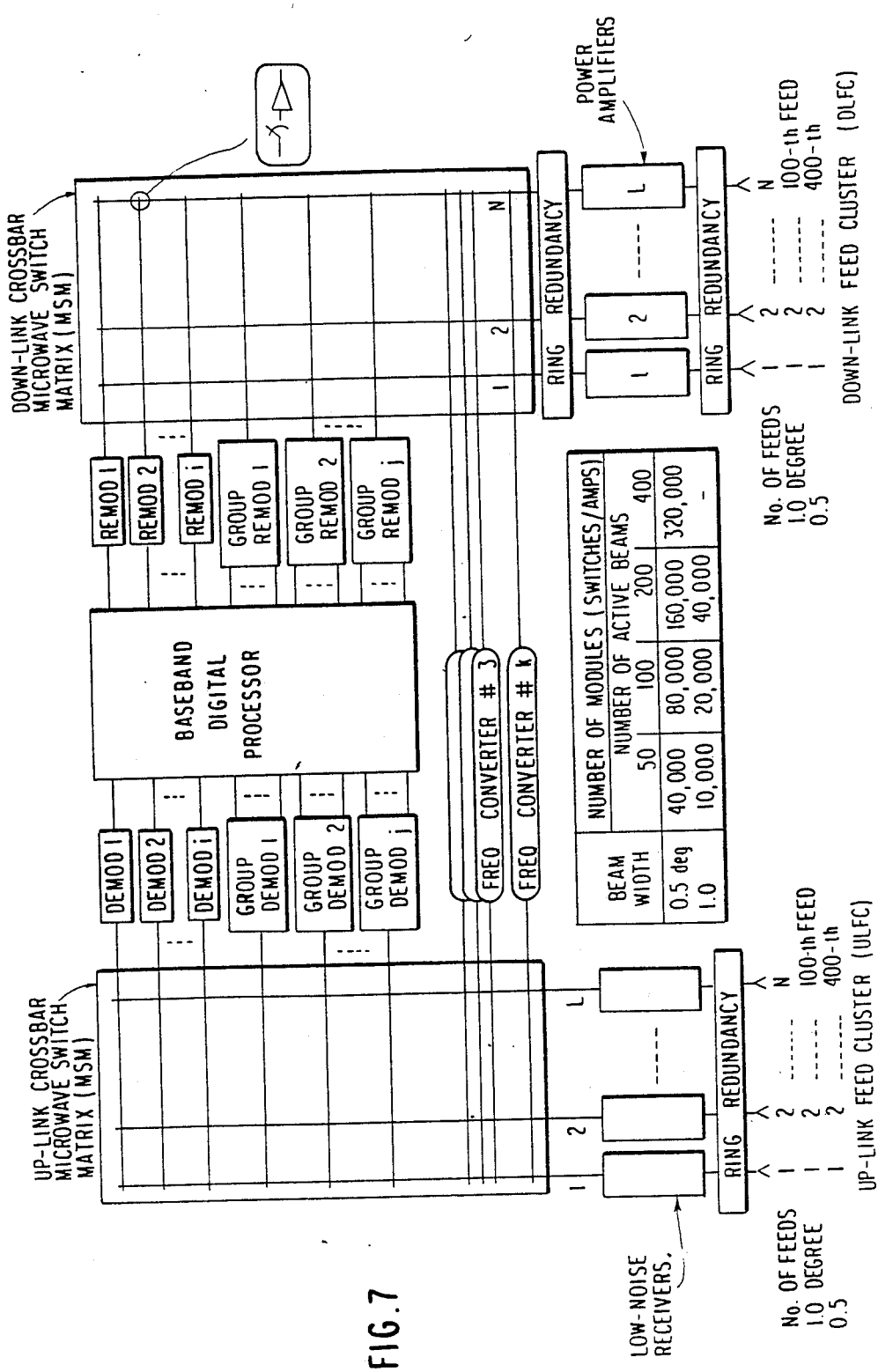
FIG. 7 is a conceptual block diagram of a new multiple hopping beam satellite system, with outer switching.

An alternative technique for obtaining flexibility is a multiple hopping beam system with outer switching. FIG. 7 is a conceptual block diagram of such a multiple hopping-beam system. In this case, BFMS are replaced With MSMs, e.g., as described by F. T. Assal, R. K. Gupta, K. Betahorn, A. I. Zaghloul and J. H. Apple "A Wideband Satellite Microwave Switch Matrix for SS-TDMA Communications " *IEEE Journal of Selected Areas in Communications*, Vol. SAC-1, pp. 223-231. The down-link MSM contains N-way equal-power divider and M-way equal-power combiner circuits (illustrated schematically as horizontal and vertical lines, respectively), and a matrix of microwave switches which connect these lines at their intersections. This MSM contains (N×M) active modules, where N=100 for the 1.0° and 400 for the 0.5° beams and $M=(i+j+k)$. Some systems may require a different set of up link and down-link beams, which may be accommodated by setting N in the up-link cluster different from N in the downlink cluster. A table within the figure displays the total number of nonredundant modules per satellite for various numbers of active beams.

A remodulator can be connected to an SSPA by turning the appropriate switch from OFF to ON. For many beams, the required capacity may occupy only a fraction of the SS-TDMA frame. For each these beams, DC prime power can be saved by turning the SSPA transmitter ON only when needed.

This configuration is called a multiple "hopping" beam satellite, since the down-link signals appear to be hopping from beam to beam at the SS-TDMA frame rate. The capacity of some beams may be sufficiently large to require combining the outputs of two or more remodulators and/or frequency down-converters. For these beams, either higher power output SSPAs or multiplexed transmitters need to be provided. If a multiplexed power transmitter system is selected, more columns must be added to the MSM. Furthermore, since an SSPA failure disables a beam, redundant amplifiers must be included either by using the double-ring redundancy network described above or by increasing the size of the MSM to (L×M), where L is greater than N, and using a single-ring redundancy as indicated in FIG. 7 for the up-links.

Outer-switching in this hopping beam system provides the desired operational flexibility, since the available RF power and access to the various demodulators or frequency translators is accomplished selectively on demand. This system does not adjust easily to different orbital locations or ocean regions unless additional feeds are included to provide for the different coverage areas. By using dual polarized arrays at C- and $K_u$-bands, up to 2 GHz of dynamic bandwidth can be provided to noncontiguous high-capacity beams. This system contains fewer active components then the scanning-beam system, as can be seen by comparing the tables in FIGS. 6 and 7.

Conceptually, the simplest and most flexible solution for beam hopping and on-board processing is the system described above with reference to FIG. 7. which contains two crossbar MSMs and a baseband digital processor. By imposing some operational restrictions and/or by increasing the complexity of input-to-output programmable mappings the number of switches can be reduced significantly. Two additional approaches will now be described, using nonredundant canonical (minimum-element) configurations to simplify the description.

With the proper controls a crossbar MSM allows any set of inputs to be connected to any sets of outputs. That is, any n can be connected to any m where (n, m) are less than or equal to the dimensions of the (N×M) rectangular matrix. This MSM allows partial and full broadcast modes in either direction (one to any m connections). This matrix is also nonblocking and non-interrupting i.e., all one-to-one connections can be made without exception, and if a subset (i.e., a limited number) of connections must be modified, it is not necessary to break and remake extraneous connections. In contrast, in order to alter the connectivity map of a number of SS-TDMA links, an interrupting matrix may require the breaking and remaking of connections in otherwise continuous transmissions of trunk lines passing through the matrix. This requires multibursting of what could have been continuous transmissions.

Figure 1:
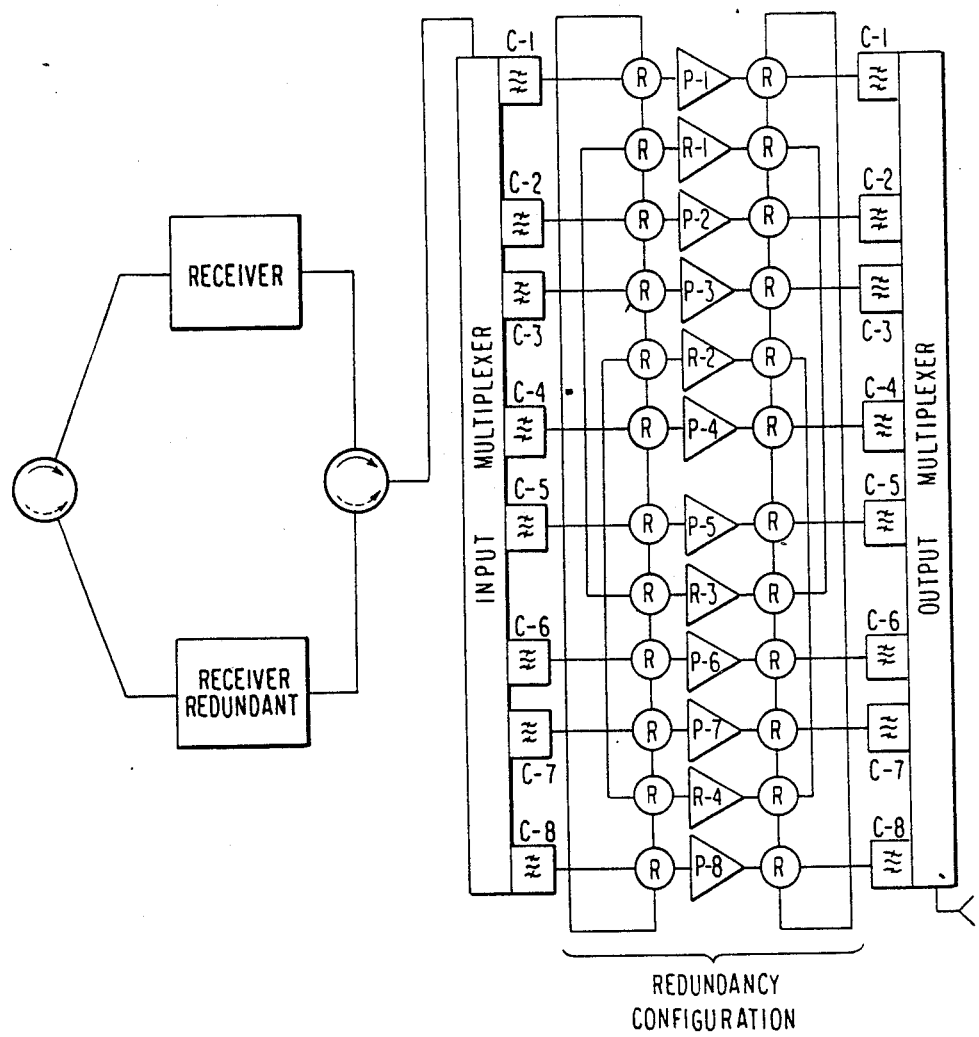
FIG. 1 is a brief schematic diagram of a satellite payload with 8 active channels and 12 power transmitters.
Figure 2:
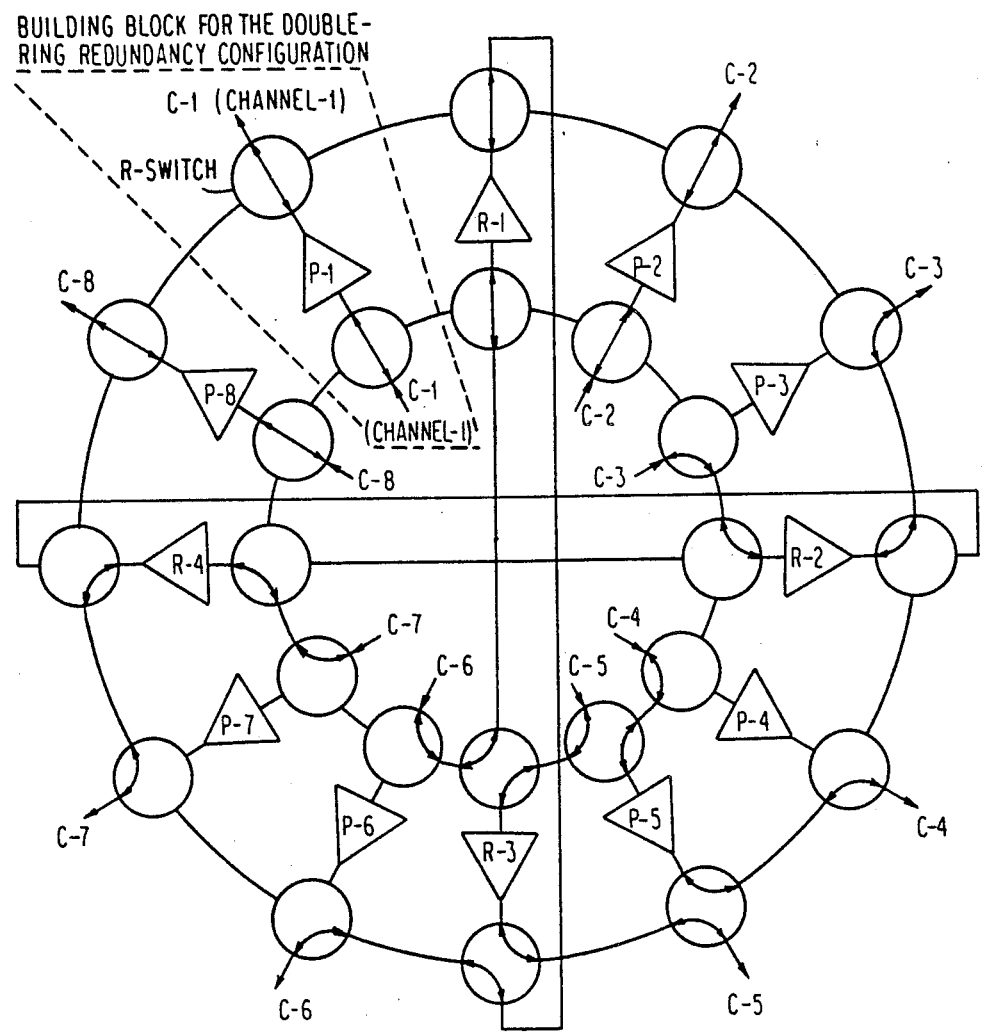
FIG. 2 is an alternative diagram of the double-ring redundancy arrangement in the subsystem of FIG. 1.
Figure 3:
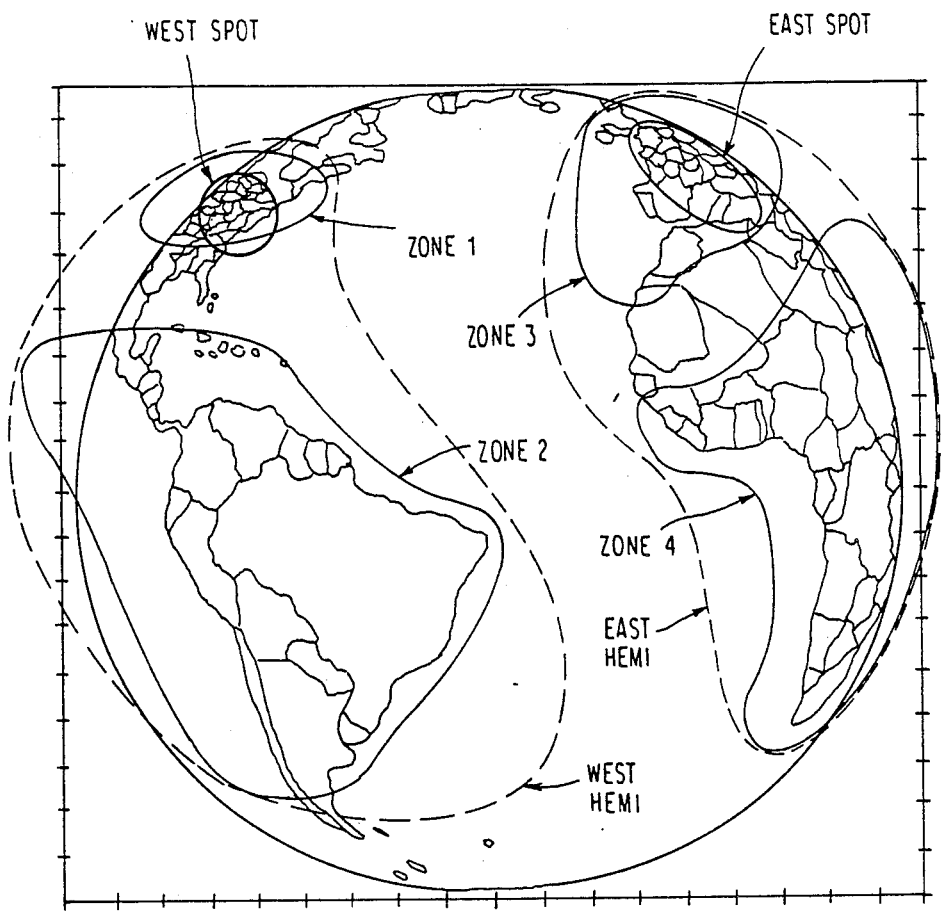
FIG. 3 is an illustration of spot, zone and hemi beams provided by INTELSAT VI in the Atlantic Ocean Region
Figure 4:
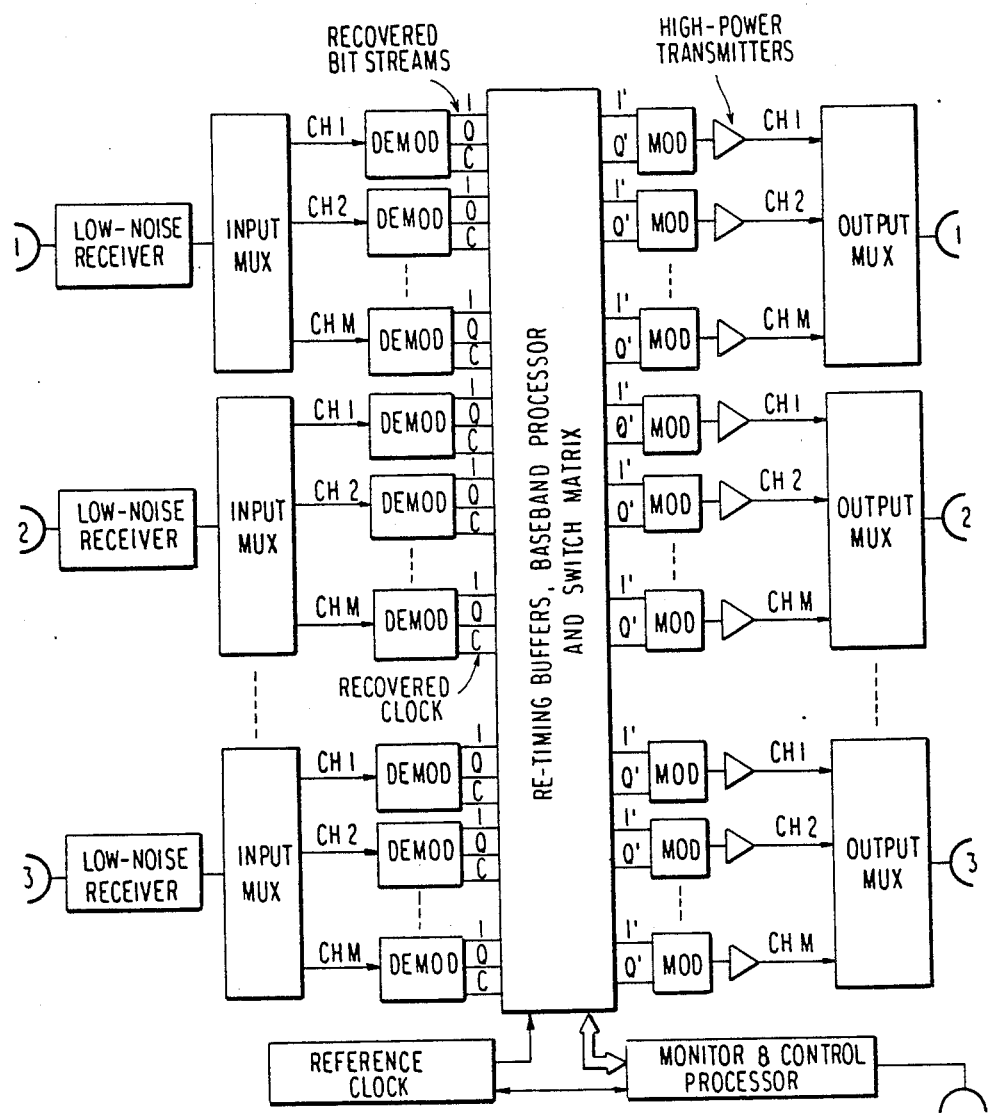
FIG. 4 is a simplified block diagram of an on-board processing fixed-multibeam satellite for SS-TDMA with inner routing/switching.
Figure 5:
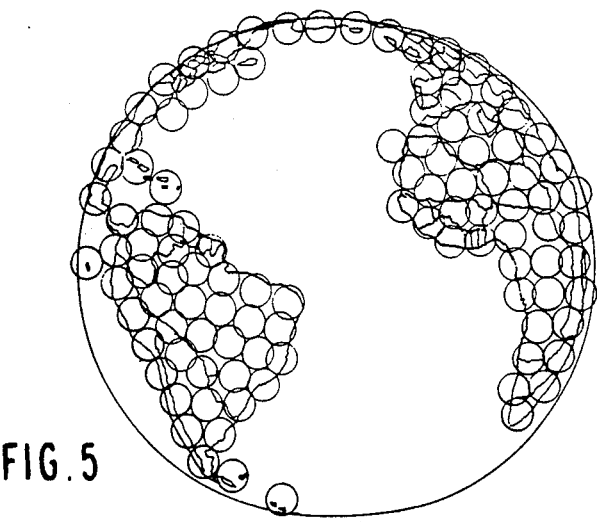
FIG. 5 is an illustration of pencil spot beams covering land masses in the Atlantic Ocean Region.
Figure 8A:
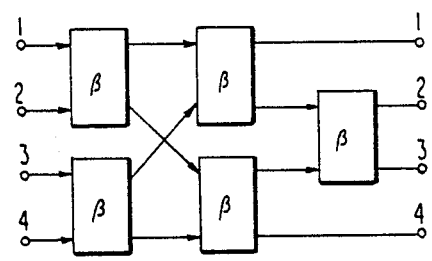
FIGS. 8(a) and 8(b) are a conceptual diagrams of rearrangeable configurations of (4×4) and (8×8) matrices, respectively using DPDT switches.

FIGS. 8(a) and (b) illustrate (4×4) and (8×8) rearrangeable switch matrices, as described for example, by A. Waksman. "A Permutation Network." *Journal of the Association of Computing Machinery*, Vol. 15, No. 1, January 1968, The (4×4) matrix consists of five double-pole double throw (DPDT) switches, or "β elements," which are connected to provide all the one-to-one interconnect possibilities between the inputs and outputs, Extension to larger matrices may be achieved by using (4×4) submatrices and DPDT elements as building blocks. In their canonical form rearrangeable matrices are nonblocking but interrupting networks. Their input-to-output interconnection mapping is complex, since the signals flow through a number of switches in cascade. For large matrices, rearrangeable matrices require a minimum number of single-pole single-throw (SPST) switches (A DPDT element contains four SPST switches), and their transmission loss is lower than that of a crossbar MSM.

Figure 9:
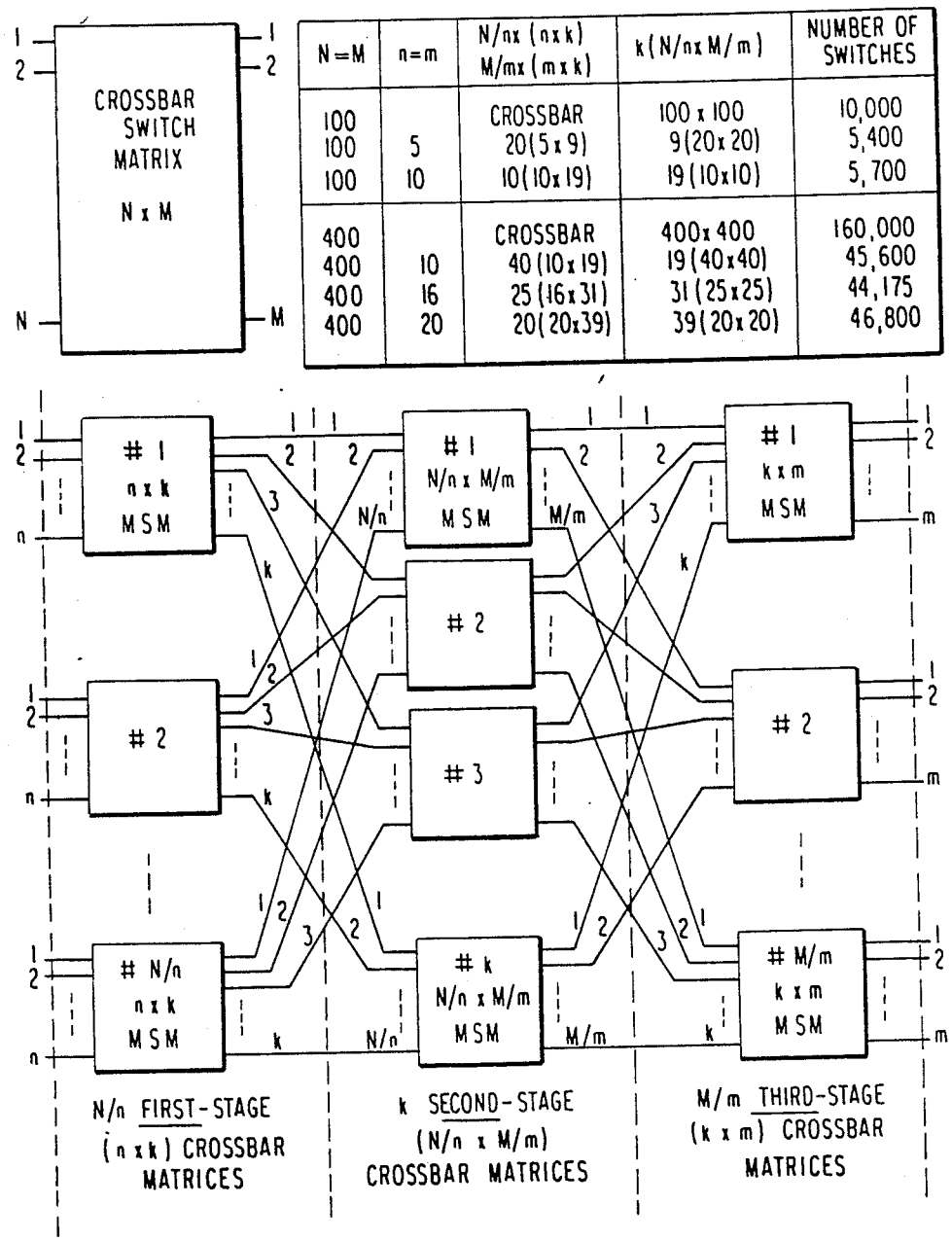
FIG. 9 is a brief diagram of an N×M cross-bar switch matrix implemented as a three-stage matrix.

A three-stage nonblocking switching network concept was presented by C. Clos, "A Study of Non-Blocking Switching Networks." *The Bell System Technical Journal*, Vol. XXXII, March 1953, pp. 406–424. FIG. 9 illustrates a (N×M) three-stage matrix consisting of three sets of crossbar matrices namely [N/n×(n×k)]. [k×(N/n×M/m)]. and [M/m×(k×m)]. Hard-wiring is done as follows. The k outputs of each of the first set of crossbar matrices are distributed among the k submatrices of the second set, and the M/m outputs of each of the second sets of crossbar matrices are distributed among the M/m submatrices of the third set. This is a nonblocking non-interrupting matrix. Compared to the crossbar matrix, implementation of this unit at microwave frequencies is more desirable, since each submatrix is smaller and more manageable to fabricate than the crossbar (N×M) MSM.

A fourth alternative will hereinafter be referred to as a "modified rearrangeable" switch matrix, In FIGS. 8(a) and 8(b), each switching element includes four SPSTs, so that the (4×4) matrix illustrated in FIG. 8(a) will require 20 SPSTs. However, a (4×4) crossbar switch matrix includes only 16 SPSTs, Thus, e.g., the number of switches needed to implement the (8×8) matrix of FIG. 8(b) could be reduced from 68 to 60 by implementing the two (4×4) matrices in FIG. 8(b) with crossbar switch matrices.

Table 1 compares the SPST element counts for the four approaches. The rearrangeable and modified rearrangeable matrices require the lowest number of elements. For example, assuming N=1024. then 36,868 SPSTs are needed for the rearrangeable matrix, and 35.844 for the modified rearrangeable matrix, compared to 190.464 and 1.048.576 for the three-stage and crossbar matrices, respectively.

TABLE 1

Switch Count Comparison of Square Matrices

| N = M | Crossbar | Clos Three-Stage | Rearrangeable | Modified Rearrangeable |
|---|---|---|---|---|
| 2 | 4 | | 4 | 4 |
| 4 | 16 | | 20 | 16 |
| 8 | 64 | | 68 | 60 |
| 16 | 256 | | 196 | 180 |
| 32 | 1,024 | 896 | 516 | 484 |
| 64 | 4,096 | 2,688 | 1,284 | 1,220 |
| 128 | 16,384 | 7,600 | 3,076 | 2,908 |
| 256 | 65,536 | 23,040 | 7,172 | 6,916 |
| 512 | 262,144 | 63,488 | 16,388 | 15,876 |
| 1,024 | 1,048,576 | 190,464 | 36,868 | 35,844 |

Embodiments of the present invention employing a distributed routing/switching concept will now be described. Still referring to FIG. 9, a multiple-hopping satellite concept can be configured by bisecting between all the outputs of the first stage and the inputs of the second stage and inserting demodulators and/or frequency down-converters. Wherever signals are demodulated, the MSMs are replaced with baseband switch matrices and processors. Finally, the matrix is bisected between all the outputs of the baseband switch matrices and processors and the inputs of the third stage, and remodulators are inserted. As a result, once a signal is demodulated, it must pass through a baseband switch matrix and processor and a remodulator before it re-enters an MSM in the third stage. Similarly, if a signal is only to be frequency translated, its second and third stages are MSMs. As indicated, this distributed switching may impose some restrictions on satellite architectures, since specific demodulator and/or frequency down-converter assignments are made to each cluster of beam-hopping elements.

Figure 10:
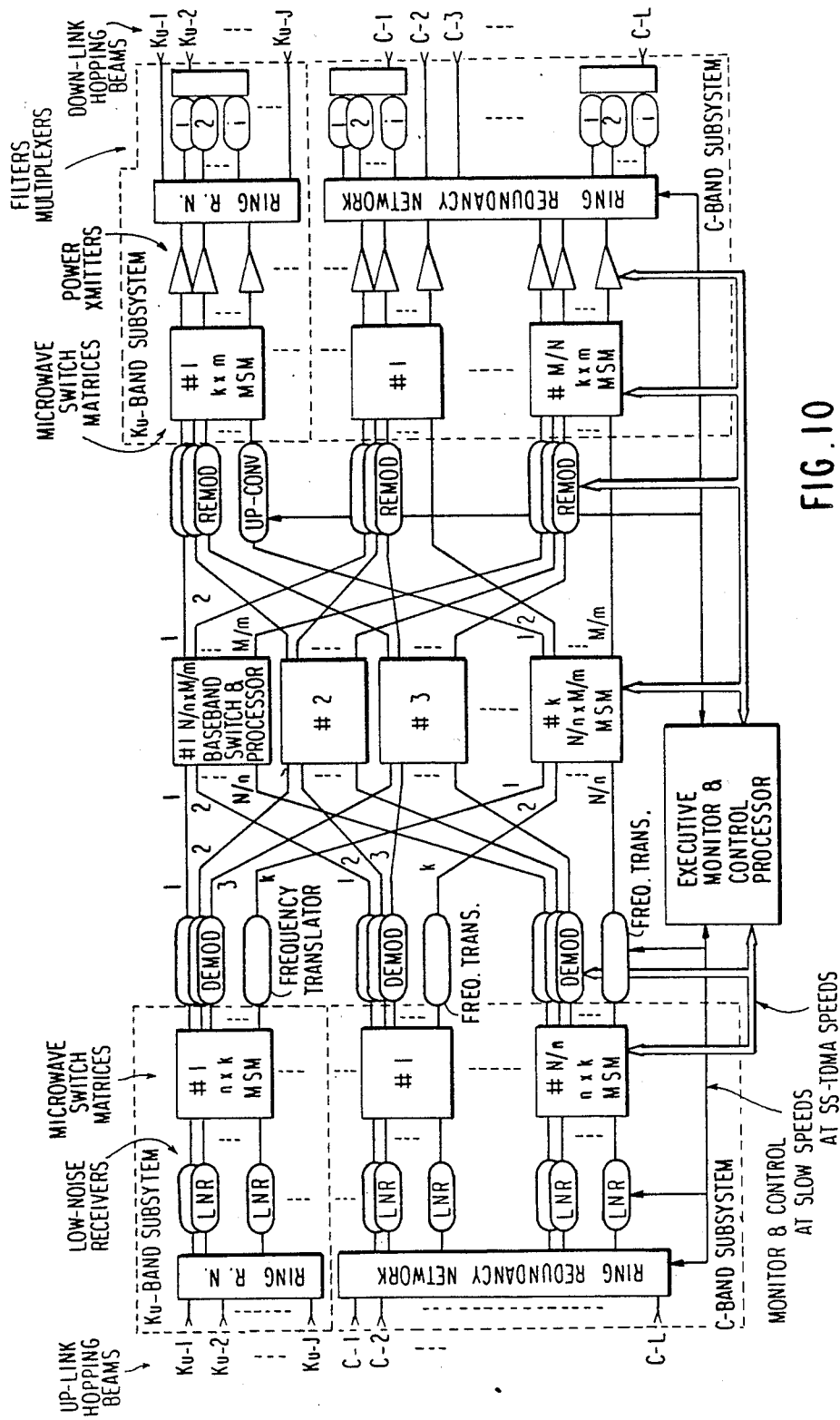
FIG. 10 is a block diagram of a multiple hopping-beam satellite payload using a three-stage switching matrix with distributed inner and outer switching.

An embodiment of the invention will be described in the context of a distributed hopping multibeam system with inner and outer switching. FIG. 10 is a block diagram of a hopping multiple-pencil-beam satellite payload, using the three-stage switch matrix concept. The configuration includes subsystems at C- and $K_u$-bands. Some of the transmission paths are demodulated (assuming single carrier demodulations or flexible bulk demultiplexing/demodulations), while others are frequency-translated to the appropriate down-link frequencies. Switching and cross-strapping for the frequency translated paths are performed at C- band. The baseband matrices process and route all incoming signals independently of their original bands or carrier center frequencies.

Each beam is generated by a single feed, as indicated in FIG. 10. There are J and L beams at the $K_u$- and C-bands respectively. For each band the up-link feeds are connected to a single-ring redundancy network, which is exercised by the executive monitor and control processor in the event of a LNR failure. Similar redundancy is provided for the SSpA transmitters. In other cases, sets of redundant transmission paths assigned to each feed cluster are provided for all the communications payload hardware, instead of localizing these functions at the specific components or subsystems.

The total number of broadband LNRs is $N=(J+L+R_{Ku}+R_C)$, where $R_{Ku}$ and $R_C$ are the number of redundant low-noise receivers at $K_u$- and C-bands, respectively. Similarly, the total number of broadband SSPAs is $M=(J+L+T_{Ku}+T_C)$, where $TK_u$ and $T_C$ are the number of redundant transmitters. Since (n×k) and (k×m) are rectangular crossbar MSMs and $K=(n+m-1)$, redundancy is automatically doubled for the demodulators, frequency converters and remodulators. On the receive side this ratio is lower, since the multi-carrier signals of the higher capacity beams are distributed among the demodulators and/or frequency converters. To ensure full connectivity and adequate redundancy, design optimization must be performed for each specific application.

As described above and shown in FIG. 10. frequency-multiplexed power transmitters are included as one possibility for the high-capacity beams. In this case, all the SSPAs could be designed to have the same output power in each band. To minimize DC power consumption, each SSPA is turned off during the short periods of time within each SS-TDMA frame for which signals are not scheduled to pass through the specific amplifier.

An executive monitor and control processor is included to control the semi-static as well as the SS-TDMA dynamic operation of the communications system, Monitoring for acceptable operation of the critical hardware and some level of autonomy could be included in the executive monitor and control processor to minimize human error in controlling this complex system. The implementation of this processor will be apparent to those of skill in the art, since hopping beam systems and the control of MSMs are well known and the functions to be performed are relatively straightforward. The control unit could be programmed to operate substantially autonomously, or could be controlled substantially or entirely from the ground.

In summary, outer-switching in this hopping beam system provides operational flexibility, since the available RF power and access to the different modems or frequency translators is accomplished selectively on demand. This flexibility is limited, depending on the size of these outer-switching MSMs. As indicated in Table 1. the number of switch modules required by the three different switch implementations differs so drastically that a number of elements could be added to this approach to alleviate some of the potential limitations on operational flexibility. This is particularly true if a distributed rearrangeable matrix is used instead of the three-stage matrix.

A variation of the embodiment of FIG. 10 but using instead a rearrangeable switch matrix implementation will now be described with reference to FIG. 14. As discussed above with reference to FIGS. 8(a) and (b) and Table 1, the use of a rearrangeable matrix will significantly reduce the number of required switching elements. To implement the distributed switching concept of the present invention utilizing a rearrangeable matrix would require that some steps be taken to ensure proper symmetry but would otherwise be straightforward given the description provided earlier herein.

Figure 8B:
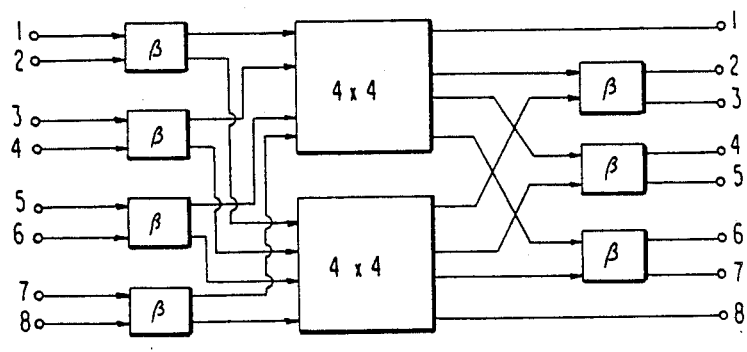

Essentially, the (4×4) matrix of FIG. 8(a) would be used as both the upper and lower (4×4) matrices in FIG. 8(b). but the orientation of the lower (4×4) matrix would be reversed. In addition to provide symmetry at the input and output sides of the matrix, a further β switching element would be added to receive the #1 output from the upper (4×4) matrix and the #4 output from the lower (4×4) matrix. When expanding to (16×16), a second (8×8) would be added which would be reversed with respect to the (8×8) shown in FIG. 14, and onward up to whatever capacity is desired. A 32×32 implementation of this is shown in FIG. 14(a), except that FIG. 14(a) does not show the additional β switching element which in this configuration would provide the #1 and #32 outputs.

Proper partitioning of the rearrangeable matrix demonstrates that a very flexible multiple hopping-beam satellite with on-board demodulation and processing can be configured using relatively few elements. With reference again to FIG. 14(a). the rearrangeable matrix can be divided along vertical lines at any desired points. e.g., as indicated by the dotted lines with the demodulators, remodulators and frequency translators being inserted as in FIG. 10. Moving the vertical division lines toward the outside of the overall rearrangeable matrix will provide less flexibility accessing different demodulators and/or frequency translators, but more flexibility in processing. Moving the vertical division lines inwardly will have the opposite effect.

Figure 14A:
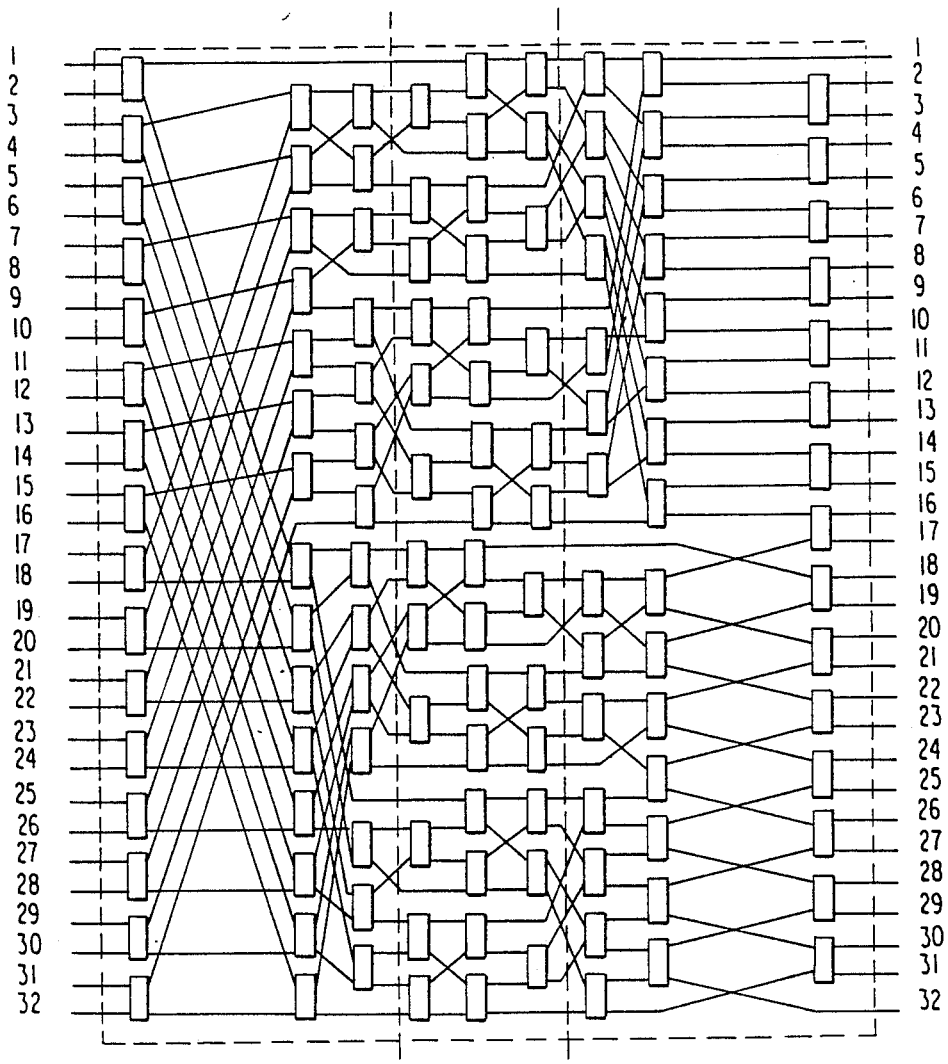
FIG. 14(a) is a diagram of a rearrangeable switch matrix for use in an implementation of the distributed switching system of the present invention.
Figure 14:
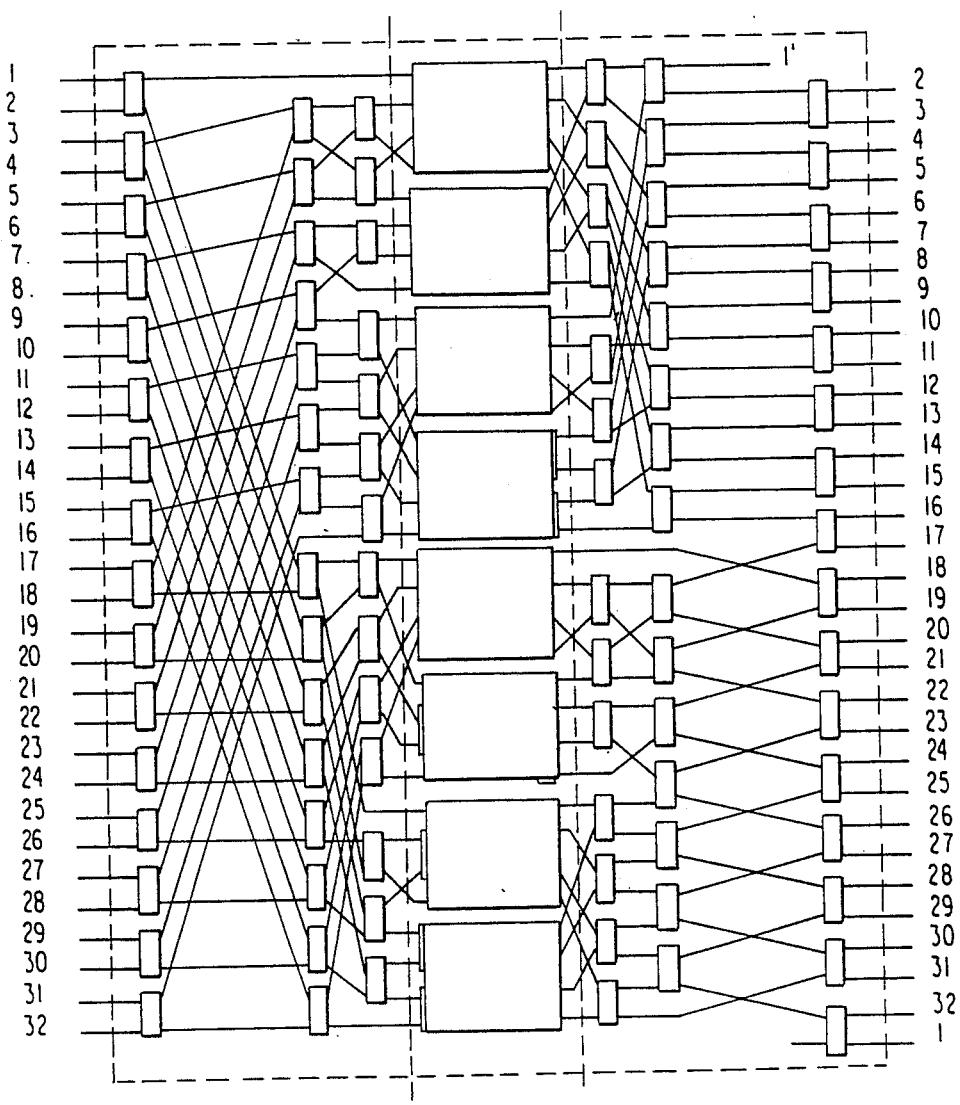
FIG. 14(b) is a diagram of a modified rearrangeable switch matrix according to the present invention.

In a still further variation, the (4×4) matrices of FIG. 14(a) would be replaced with crossbar switch matrices as discussed above with respect to the modified rearrangeable switch matrix referred to in Table 1. This would result in a configuration as shown in FIG. 14(b). which also shows the additional β switching element for providing the outputs #1 and #32, which would also be included in the same manner in FIG. 14(a) but is not shown in that Figure. The overall arrangement of the invention would otherwise be the same as described above with respect to FIGS. 10 and 14(a) This would result in a still further reduction in the amount of switching hardware.

It should also be apparent that distributed switching system of the present invention could be implemented using a separate and complete rearrangeable or modified rearrangeable matrix for each of the MSMs in FIG. 10.

As will be apparent from the above description of the adjustability of the vertical dividing lines in the case of rearrangeable switch matrices, the actual amount of switching/routing allocated to each of the three different sections of switching performed in the distributed switching systems of the present invention can be varied to meet the requirements of each application. Extending this same concept to the case of a Clos three-stage matrix implementation, it will be apparent that there might be more than three stages as that term is used in the Clos paper, e.g., 5 stages, 7 stages or any other number. It is only necessary that the total number of these stages be distributed across three switching sections to achieve the distributed switching concept of the present invention.

The most significant deficiency of beam-hopping configurations is that they require additional switches (most likely passive and mechanical) at the LNR inputs and SSPA outputs. This system does not adjust easily to different orbital locations or ocean regions unless additional feeds are included to provide for the different coverage areas. By using dual polarized arrays of C- and $K_u$-bands, up to 2 GHz of dynamic bandwidths or four times the single polarization single beam 500 MHz bandwidth, can be provided to noncontiguous high-capacity beams.

A second alternative system according to the present invention will now be described with reference to FIGS. 11–13 and comprises a reliability-enhanced multibeam communications satellite configuration that combines features of both scanning and hopping beams and requires a lesser amount of hardware. The configuration of FIG. 12 assumes that the satellite is basically a routing matrix in the sky, cyclically connecting earth stations in the satellite receive-to-transmit beams in a satellite-switched, time-division multiple-access (SS-TDMA) mode. Therefore, the three-stage nonblocking switching network concept presented by C. Clos "A Study of Non-Blocking Switching Networks," *The Bell System Technical Journal* Vol. XXXII, March 1953, pp. 406–424, may be employed in this case to reduce the number of elements.

As mentioned previously, the graceful degradation property of active phase arrays provides a built-in redundancy feature for scanning-beam systems. However, this is negated by the large size of the BFMs, as indicated in the table of FIG. 6. On the other hand, the distributed beam-hopping system, which contains relatively few elements requires multiplexed transmitters, and additional redundancy switching for LNRs and SSPAs. The hybrid configuration of the present invention combines the desirable features of both systems, The hybrid is basically a scanning-beam system from the optical configuration viewpoint. The total coverage region is divided into a number of hopping-beam areas, e.g., as shown in FIG. 11, where each area is covered by a number of simultaneously scanning spot beams which are generated by a BFM dedicated to that area. In some areas, the beam is turned off cyclically, since the total communications traffic does not fill the SS-TDMA frame.

In this hybrid system, the receive and transmit antenna feeds are organized in clusters. Each cluster of n feeds, together with a BFM, is used to produce a set of L simultaneous beams that can scan anywhere within an assigned coverage area as shown in FIG. 11. For example, if it were desired to turn off communications to one of the hopping beam areas in FIG. 11, the up-link and down-link clusters serving that area would simply be deactivated. Thus, hopping occurs between clusters, while scanning occurs within each cluster.

Figure 12:
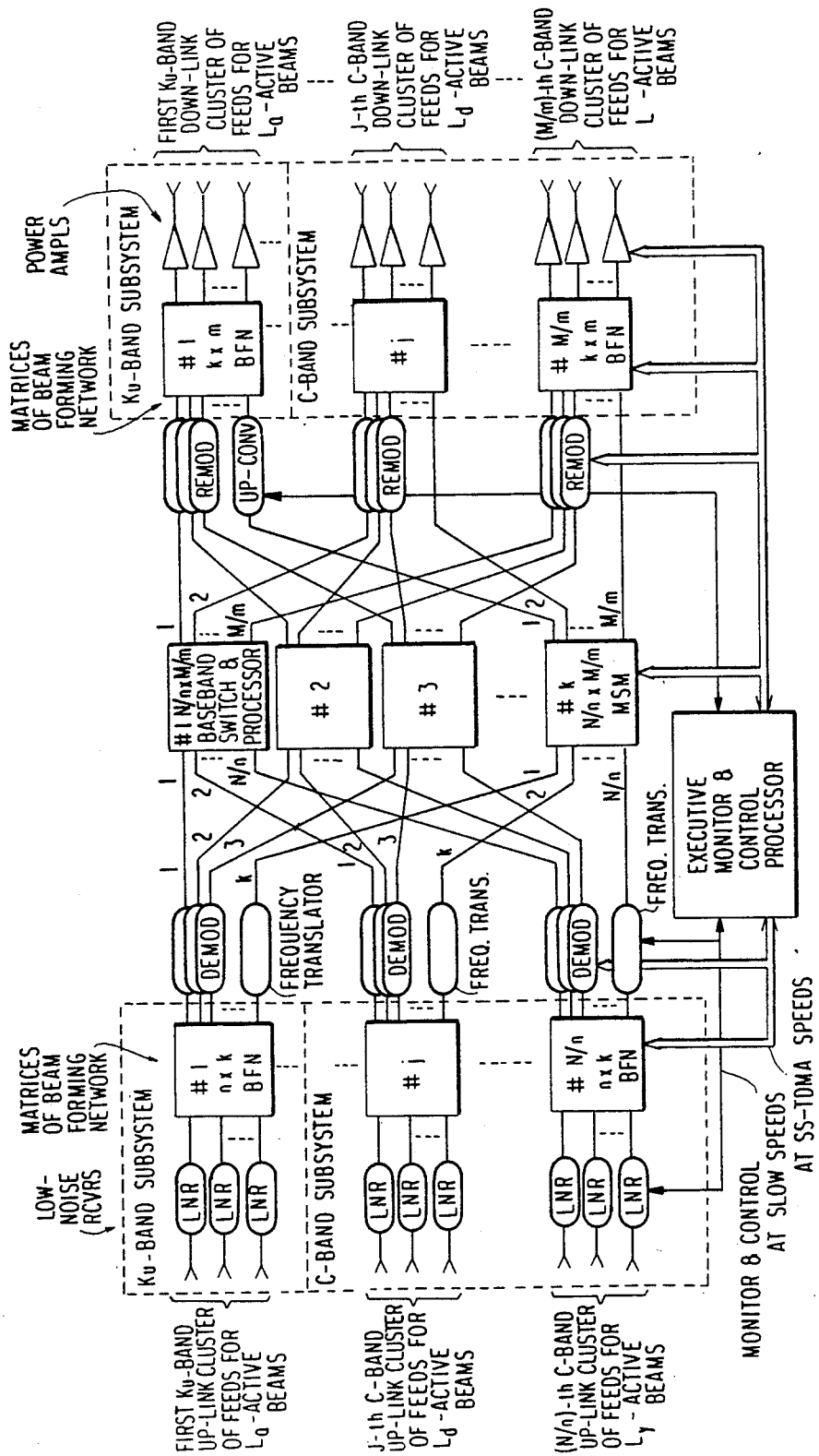
FIG. 12 is a simplified block diagram of a hybrid multiple scanning-hopping-beam satellite payload using a three-stage matrix, with distributed outer-routing.

This scanning-hopping satellite concept consists of several building blocks, as shown in FIG. 12. From left to right in the figure, there are (N/n) receive or up-link feed clusters (ULFCs), LNRs, (N/n) BFMs, a set of demodulators or frequency translators, a set of baseband switch/processors or MSMs, remodulators or up-converters, (M/m) BFMs, M SSPAs, and (M/m) transmit or down-link feed clusters (DLFCs).

Beginning at the upper left, the block diagram presents the receive side of the $K_u$-band subsystem. A cluster of n feeds is connected to n LNRs in one polarization. The output terminals are subsequently connected to a $K_u$-band (n×k) crossbar BFM. where the signals are routed dynamically/cyclically to the selected demodulator or frequency translator. Each BFM contains (n+k) power dividers to distribute and combine the signals, (n×k) digital phase shifters, and (n×k) buffer amplifiers. Depending on the setting of the phase shifters, signals coming from up to $L=(k-r)$ narrow beams within a coverage area are separated at the inputs to the demodulators and/or frequency translators. The integer r is the number of redundant signal paths provided for the BFM to the demodulators or frequency translators. Note that the number of active beams could be greater than n. The signals, then, flow to the baseband switch and processor or to C-band (N/n×M/m) MSMs.

In the block diagram of FIG. 12 it is assumed that the demodulators may be operating at different bit rates and/or some of them may, in fact, be flexible on-board demultiplexers/demodulators. In this system, frequency discrimination, i.e., filtering, is primarily done in the demodulators remodulators, frequency translators and up-converters. Unless a different redundancy strategy is provided for the demodulators. frequency translators and up-converters, e.g., by grouping all the same demodulators frequency translators and up-converters from different feed clusters to be within a ring redundancy configuration their center frequencies should be made adjustable dynamically on command, The signals, then, flow to the baseband switch and processors, or to C-band (N/n×M/m) MSMs, In the baseband switch and processor that is after demodulation, the recovered bit streams are, at the very least, bit-timing resynchronized and then routed dynamically/cyclically to the desired DLFCs. These regenerated bit streams can modulate carriers directly at $K_u$- or C-bands. Control of the BBS/Ps and C-band MSMs is provided by the executive monitor and control processor (EM&CP) at the SS-TDMA frame rate. At the C- band MSM outputs, the signals flow through the U/Cs into the $K_u$-band BFMs, or go directly into the C-band BFMs.

Following the BFMs, the signals are then power amplified in an SSPA and retransmitted via the appropriate DLFC. In the actual layout of this hybrid system, several $K_u$ and C-band feed clusters, which are implied in FIG. 12 would have to be included.

Figure 13:
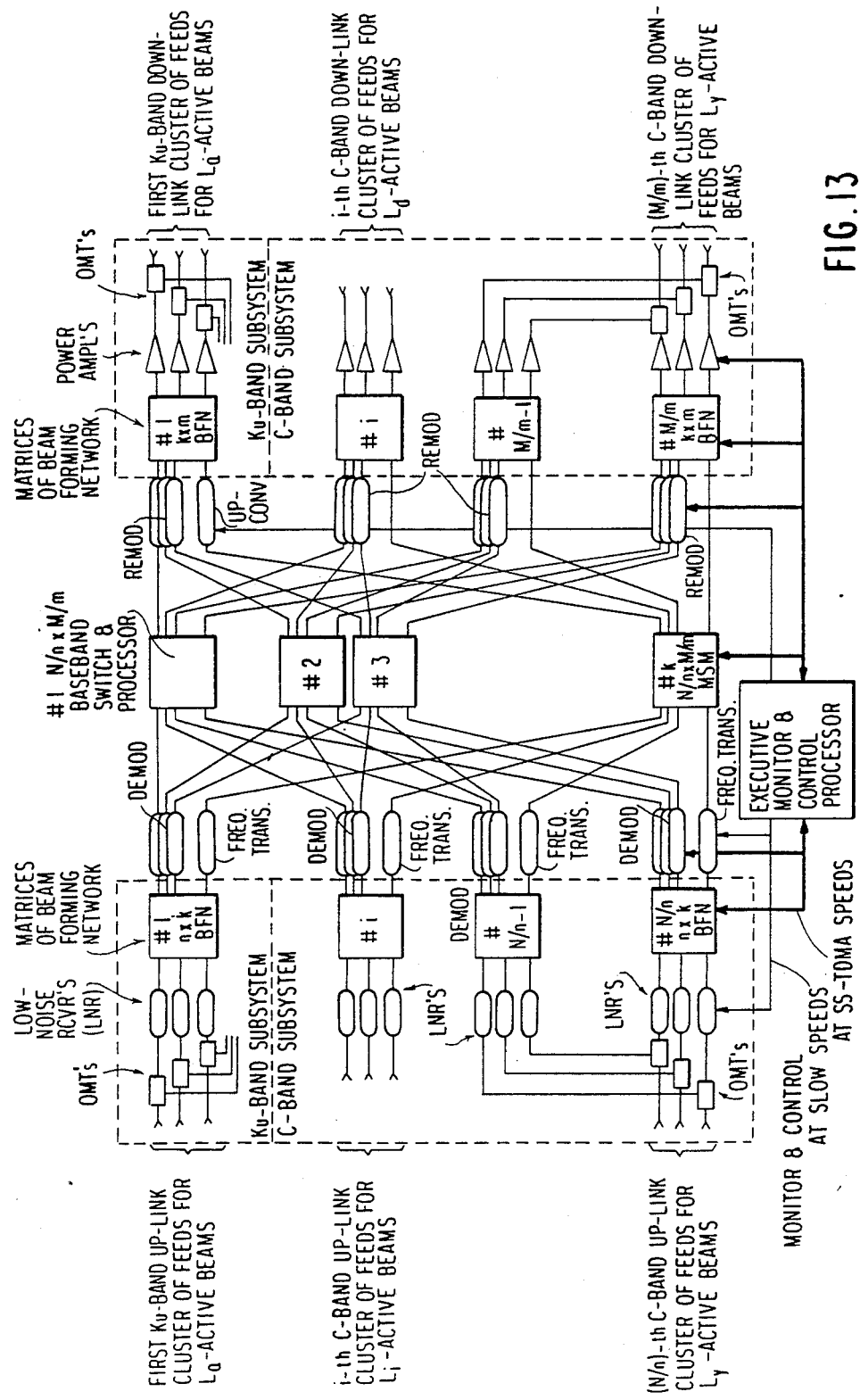
FIG. 13 is a diagram of a system similar to FIG. 12 except that it includes orthomode transducers (OMTs) for dual polarization operation.

An alternative arrangement is illustrated in FIG. 13, wherein orthomode transducers have been added prior to the LNRs and subsequent to the SSPAs for dual polarization operation, In this system as well, frequency discrimination, i.e , filtering, is primarily done in the demodulators, remodulators, frequency translators and up-converters. Additional filters, needed to limit out-of-band emissions could be included as integral parts of the OMTs.

In this as well as in the distributed beam-hopping configuration, the sizes of the BFMs, MSMs. and BBS/Ps are relatively small arrays (i.e., less than or equal to 20×20) arrays which will be easier and cheaper to design, fabricate, troubleshoot, test, and flight qualify as modulator subsystems. Also, this approach is both noise-figure and power efficient, since the circuit losses associated with the relatively small arrays of beam forming matrices are much lower than for the correspondingly large (N×M) crossbar MSM or BFM, The matrices of BFMs, located in the first and third blocks, can be viewed in a limited sense as broadband crossbar routing matrices.

By selectively adding dual-polarized feed clusters at C- and $K_u$-bands, some high-capacity regions could have approximately 2 GHz of instantaneous bandwidth, or four times the single polarization, single band 500 MHz bandwidth. Since several modulated carriers may be transmitted through each SSPA, the carriers must be sized to operate in the linear range of the SSPA transfer characteristics.

Figure 11:
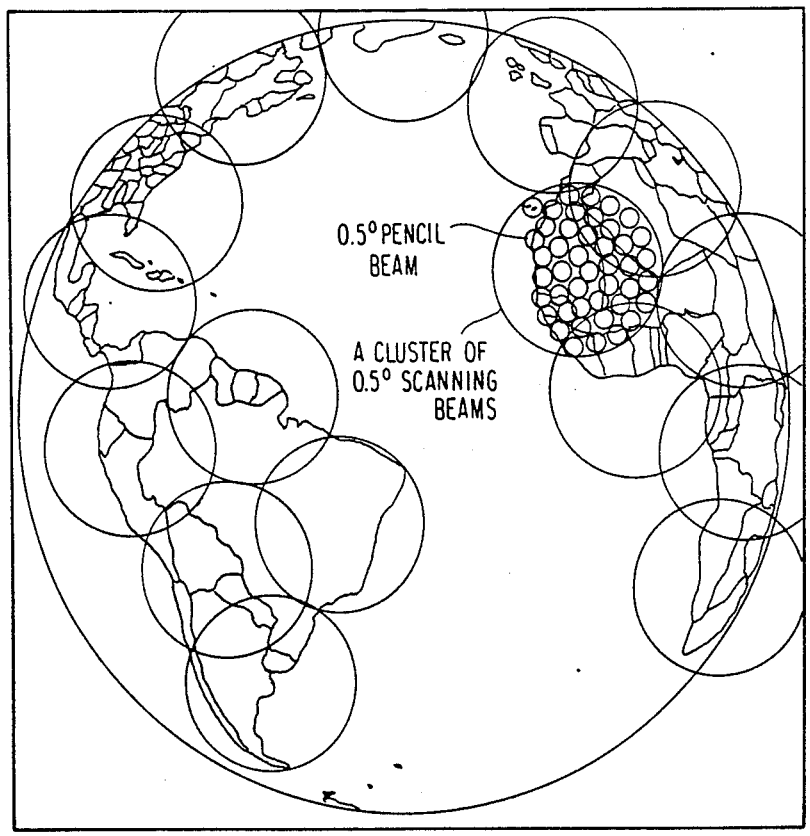
FIG. 11 is an illustration of a representative set of active scanning-hopping beams.

FIG. 11 shows a representative set of active beams. The receive and transmit antennas consist of clusters of single- or dual-polarized feed elements operating at C- or K$_u$-bands. As was previously indicated, each cluster generates a very narrow beam that can be scanned to cover a defined region on the surface of the earth. By properly programming and synchronizing the phase control elements of the same BFM, a number of beams could be operating simultaneously at different channel center frequencies. The availability of the dual-polarized feed clusters at C- and K$_u$-bands could provide any region with approximately 2 GHz of instantaneous bandwidth. The SSPAs must be sized to operate in the "linear" range of their transfer characteristics for a potentially large number of modulated carriers expected to make up the traffic in coverage areas with (perhaps) saturating capacity.

It is believed, however, that very few regions would require that much instantaneous bandwidth in the foreseeable future. Therefore, dual polarization and/or operation at the two frequency bands should be planned and included only if the traffic forecast requires an instantaneous bandwidth in excess of 500 MHz. Since the system is configured to provide full interconnectivity among the separate beam clusters, a great deal of operational flexibility is built in. For example, the composite coverage areas produced by the antenna feed clusters should contain adequate overlap, and be sufficiently large to accommodate both the different orbital locations and the possibility of highly inclined orbits. Since the signals are combined in space, fail-soft redundancy is naturally provided with and is built into, the active arrays. Therefore some of the LNRs and SSPAs can be turned off until they are needed. Furthermore, some of the SSPAs can be turned off at the beginning of satellite life, since excess capacity would be available at that time. Therefore, this architecture, which provides redundant transmission paths into the demodulators and fail-soft combining of the signals at the ULFCs, could be sized to ensure the required enhanced reliability for a 20-year life. Finally, in order to minimize DC power dissipation this satellite concept permits beam hopping, since all the active elements especially the SSPAs that are connected to particular cluster of feeds, can be turned off during a portion of the SS-TDMA frame whenever the total capacity of the region is limited to a fraction of the SS-TDMA frame.

We claim:

1. A communications relay apparatus of the type including receive means for receiving communications over a plurality of receiving channels transmit means for transmitting communications over a plurality of transmit channels, and means for routing communications received over any of said receiving channels to any of said transmit channels, said relay apparatus comprising:

first receive outer switching means having inputs connected to a first plurality of said receive channels and selectively directing its inputs to any one of at least first and second outputs;

at least a first demodulator connected to said first output of said first receive outer switching means for providing demodulated data from at least one of said first and second receive channels;

at least a first input means connected to said second output of said first receive outer switching means and for providing modulated data from at least one of said first and second channels;

second receive outer switching means having inputs connected to at least third and fourth receive channels and selectively directing its inputs to any one of at least first and second outputs;

at least a second demodulator connected to said first output of said second receive outer switching means for providing demodulated data from at least one of said third and fourth receive channels;

at least a second input means connected to said second output of said second receive outer switching means and for providing modulated data from at least one of said third and fourth channels;

first inner switching means having at least first and second inputs connected to outputs of said first and second demodulators, respectively, said first inner switching means selectively directing demodulated data from its first and second inputs to either of at least first and second outputs of said first inner switching means;

second inner switching means having at least first and second inputs connected to outputs of said first and second input means, respectively said second inner switching means selectively directing modulated data from its first and second inputs to either of at least first and second outputs of said second inner switching means;

a first remodulation means having an input connected to said first output of said first inner switching means;

a first output means connected to said first output of said second inner switching means; and first transmit outer switching means having at least a first input connected to an output of said first remodulation means and a second input connected to said first output means, said first outer transmit switching means selectively directing modulated data from its first and second inputs to either of at least first and second outputs of said first outer transmit switching means.

2. An apparatus as defined in claim 1, wherein said first and second input means comprise frequency translators.

3. An apparatus as defined in claim 1 wherein said first output means comprises a frequency translator.

4. An apparatus as defined in claim 1 wherein said first output means comprises a direct connection.

5. An apparatus as defined in claim 1, wherein said first and second channels are in a first frequency band and said third and fourth channels are in a second frequency band.

6. An apparatus as defined in claim 1, wherein said apparatus comprises a multiple hopping-beam satellite and said receive and transmit outer switching means comprise microwave switch matrices.

7. An apparatus as defined in claim 6, further comprising first redundant connection means connected between a plurality of up-link antennas and the inputs to each of said receive outer switching means, and second redundant connection means connected between the outputs of each of said transmit outer switching means and a plurality of down-link antennas.

8. An apparatus as defined in claim 6, wherein said first and second receive outer switching means, first and second inner switching means and first transmit outer switching means collectively form a multistage switch matrix.

9. An apparatus as defined in claim 6, wherein said first and second receive outer switching means, first and second inner switching means and first transmit outer switching means collectively form a rearrangeable switch matrix.

10. An apparatus as defined in claim 9, wherein said rearrangeable switch matrix includes a plurality of (4×4) switch matrices each of which comprises a crossbar switch matrix.

11. An apparatus as defined in claim 10, wherein each of said β switching elements comprises a double-pole-double-throw (DPDT) switch.

12. An apparatus as defined in claim 6, wherein each of said first and second receive outer switching means and said first transmit outer switching means matrix.

13. An apparatus as defined in claim 12, wherein said rearrangeable switch matrix includes a plurality of (4×4) switch matrices each of which comprises a crossbar switch matrix.

14. An apparatus as defined in claim 6, wherein said first input means translates the signal from said second output of said first receive outer switching means to a desired down-link frequency.

15. An apparatus as defined in claim 1, further comprising a second transmit outer switching means having first and second inputs and outputs, a second remodulation mean coupling said second output of said first inner switching means to said first input of said second transmit outer switching means and a second output means connecting said second output of said second inner switching means to said second input of said second transmit outer switching means.

16. An apparatus as defined in claim 1 wherein said first inner switching means comprises a baseband switch and processor.

17. An apparatus as defined in claim 16, wherein said second inner switching means comprises a microwave switch matrix.

18. A communications relay apparatus of the type including receive means for receiving communications over a plurality of receiving channels, transmit means for transmitting communications over a plurality of transmit channels, and means for routing communications received over any of said receiving channels to any of said transmit channels, said relay apparatus comprising:
first receive outer routing means having inputs connected to a first plurality of said receive channels and selectively directing its inputs to any one of at least first and second outputs;
at least a first demodulator connected to said first output of said first receive outer routing means for providing demodulated data from at least one of said first and second receive channels;
at least a first input means connected to said second output of said first receive outer routing means and for providing modulated data from at least one of said first and second channels;
second receive outer routing means having inputs connected to at least third and fourth receive channels and selectively directing its inputs to any one of at least first and second outputs;
at least a second demodulator connected to said first output of said second receive outer routing means for providing demodulated data from at least one of said third and fourth receive channels;
at least a second input means connected to said second output of said second receive outer routing means and for providing modulated data from at least one of said third and fourth channels;
first inner switching means having at least first and second inputs connected to outputs of said first and second demodulators, respectively, said first inner switching means selectively directing demodulated data from its first and second inputs to either of at least first and second outputs of said first inner switching means;
second inner switching means having at least first and second inputs connected to outputs of said first and second input means, respectively, said second inner switching means selectively directing modulated data from its first and second inputs to either of at least first and second outputs of said second inner switching means;
a first remodulation means having an input connected to said first output of said first inner switching means;
a first output means connected to said first output of said second inner switching means; and
first transmit outer routing means having at least a first input connected to an output of said first remodulation means and a second input connected to said first output means, said first outer transmit routing means selectively directing modulated data from its first and second inputs to either of at least first and second outputs of said first outer transmit routing means.

19. An apparatus as defined in claim 18, wherein said first and second input means comprise frequency translators.

20. An apparatus as defined in claim 18 wherein said first output means comprises a frequency translator.

21. An apparatus as defined in claim 18, wherein said first output means comprises a direct connection.

22. An apparatus as defined in claim 18, wherein said first and second channels are in a first frequency band and said third and fourth channels are in a second frequency band.

23. An apparatus as defined in claim 18, wherein said first input means translates the signal from said second output of said first receive outer routing means to a desired down-link frequency.

24. An apparatus as defined in claim 18, further comprising a second transmit outer routing means having first and second inputs and outputs, a second remodulation means coupling said second output of said first inner switching means to said first input of said second transmit outer routing means and a second output means connecting said second output of said second inner switching means to said second input of said second transmit outer routing means.

25. An apparatus as defined in claim 18, wherein said first inner switching means comprises a baseband switch and processor.

26. An apparatus as defined in claim 25, wherein said second inner switching means comprises a microwave switch matrix.

27. An apparatus as defined in claim 18, wherein said apparatus comprises a multiple hybrid scanning-hopping-beam satellite and said receive and transmit outer routing means comprise beam forming matrices.

28. An apparatus as defined in claim 27, wherein a total region of coverage by said satellite is divided into a plurality of hopping beam areas and each hopping beam area is covered by a plurality of simultaneously scanning spot beams all generated by a beam forming matrix dedicated to said area.

29. A communications relay apparatus of the type including receive means for receiving communications over a plurality of receiving channels, transmit means for transmitting communications over a plurality of transmit channels, and means for routing communications received over any of said receiving channels to any of said transmit channels, said means for routing comprising:
- first means having inputs connected to a first plurality of said receive channels and selectively directing its inputs to any one of at least first and second outputs of said first means;
- second means having a plurality of inputs and a plurality of outputs and selectively directing its inputs to any one of at least first and second outputs of said second means;
- third means having a plurality of inputs and a plurality of outputs and selectively directing its inputs to any one of at least first and second outputs of said third means;
- first coupling means for coupling the outputs of said first means to the inputs of said second means;
- second coupling means for coupling the outputs of said second means to the inputs of said third means; and
- at least one of said first and second coupling means including means for changing the frequency of a received signal prior to providing it to a respective input.

30. An apparatus as defined in claim 29, further comprising control means for independently controlling each of said first second and third means.

31. An apparatus as defined in claim 29, wherein said at least one of said first and second coupling means comprises a demodulator.

32. An apparatus as defined in claim 29 wherein said at least one of said first and second coupling means comprises a frequency translator.

33. An apparatus as defined in claim 32 wherein said at least one of said first and second coupling means comprises said first coupling means.

34. An apparatus as defined in claim 29, wherein said first coupling means comprises a demodulator and said second coupling means comprises a remodulator.

35. An apparatus as defined in claim 34, wherein said first coupling means further comprises a frequency translator.

36. An apparatus as defined in claim 29, wherein said first and third means comprise microwave switch matrices.

37. An apparatus as defined in claim 36, wherein said second means comprises a baseband switch and processor means.

38. An apparatus as defined in claim 29, wherein said second means comprises a baseband switch and processor means.

39. An apparatus as defined in claim 29, wherein said first and third means comprise beam forming matrices.

40. An apparatus as defined in claim 39, wherein said second means comprises a microwave switch matrix.

* * * * *

UNITED STATES PATENT AND TRADEMARK OFFICE
CERTIFICATE OF CORRECTION

PATENT NO. : 4,931,802

DATED : June 5, 1990

INVENTOR(S) : Assal et al

It is certified that error appears in the above-identified patent and that said Letters Patent is hereby corrected as shown below:

Column 3,    line 17,   after "SS" insert -- - --.

Column 5,    line 2,    delete "a" and insert --Q--.

Column 17,   line 12,   after "means" insert --comprises a separate and complete rearrangeable switch--.

Signed and Sealed this

Fifth Day of November, 1991

Attest:

HARRY F. MANBECK, JR.

*Attesting Officer*      *Commissioner of Patents and Trademarks*